United States Patent [19]

Arnold

[11] 4,250,417
[45] Feb. 10, 1981

[54] AIR DEFLECTOR FOR ELECTRIC MOTOR
[75] Inventor: Harold D. Arnold, St. Louis, Mo.
[73] Assignee: Emerson Electric Co., St. Louis, Mo.
[21] Appl. No.: 971,864
[22] Filed: Dec. 21, 1978
[51] Int. Cl.$^3$ ............................................. H02K 9/06
[52] U.S. Cl. ..................................... 310/62; 310/42; 310/260
[58] Field of Search ....................... 310/52, 53, 54, 55, 310/58, 59, 60, 62, 63, 64, 65, 260, 258, 254, 42

[56] References Cited
U.S. PATENT DOCUMENTS

| | | | |
|---|---|---|---|
| 1,300,373 | 4/1919 | Garcelon | 310/63 |
| 1,325,232 | 12/1919 | Cook | 310/52 |
| 1,742,182 | 1/1930 | Barr | 310/63 |
| 2,422,824 | 6/1947 | Clauson | 310/52 |
| 2,469,820 | 5/1949 | Fuge | 310/58 |
| 2,545,855 | 3/1951 | Luenberger | 310/58 |
| 3,518,467 | 6/1970 | Wightman | 310/63 |

Primary Examiner—R. Skudy
Attorney, Agent, or Firm—Polster, Polster and Lucchesi

[57] ABSTRACT

An air deflector mountable within an electric motor adjacent the outer periphery of a cooling fan within the motor and adjacent the stator winding end turns of the motor so as to inhibit circular flow of air within the motor and to ensure axial flow of air through the motor. In a first embodiment of the air deflector of this invention, the deflector is mounted on the stator through-bolts extending axially from the stator core of the motor, the through-bolts holding the end shields in place on the motor shell. In another embodiment of this invention, the deflectors are forceably inserted in the stator winding end turns and are held in place by the end turns and by the motor shell and are held captive between the stator core and a motor end shield.

6 Claims, 7 Drawing Figures

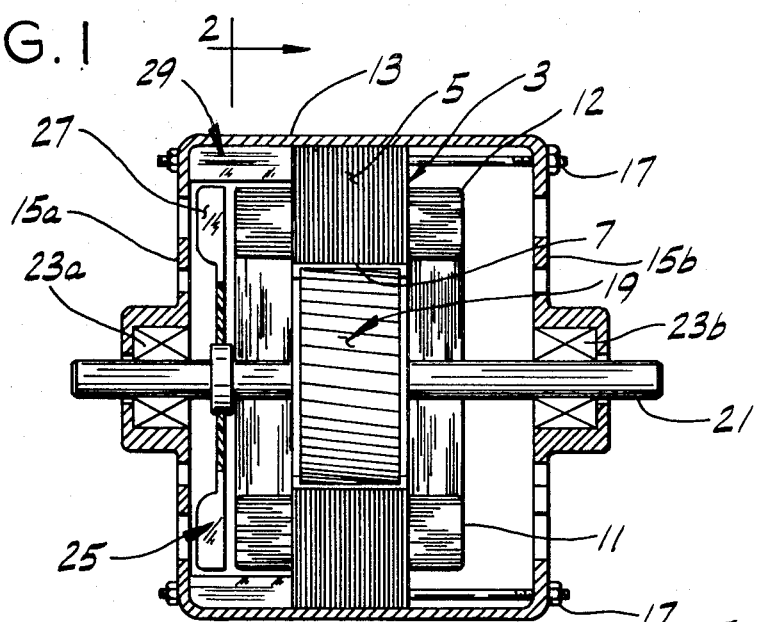
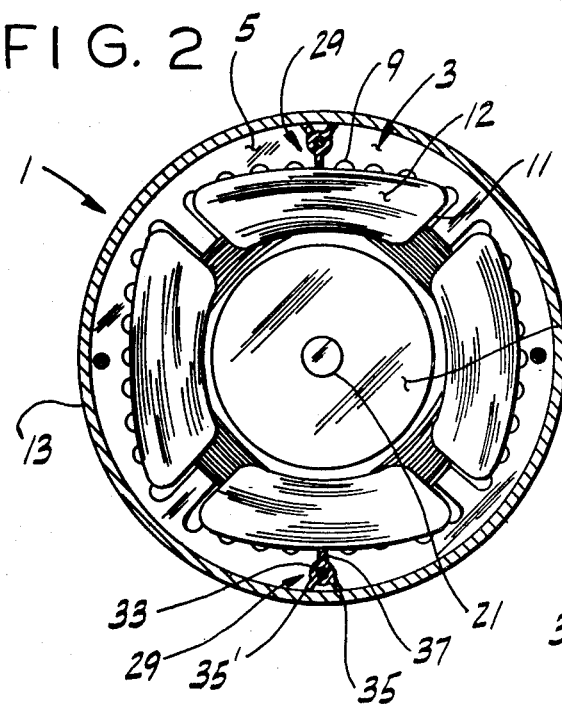
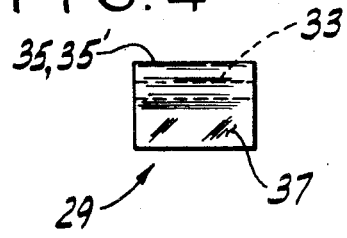
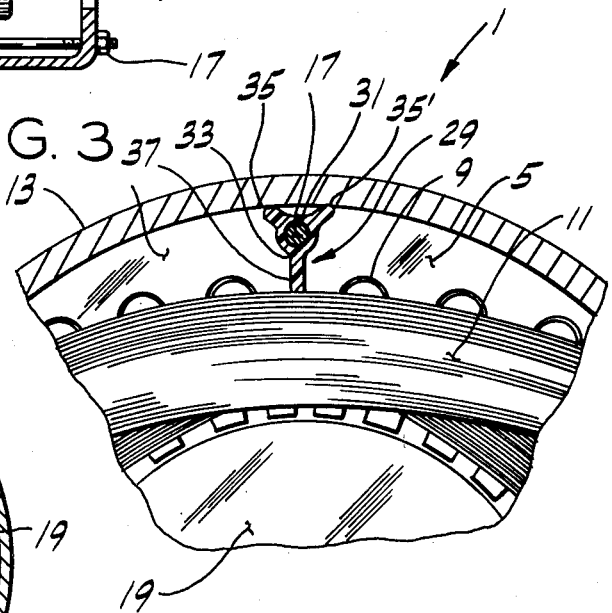
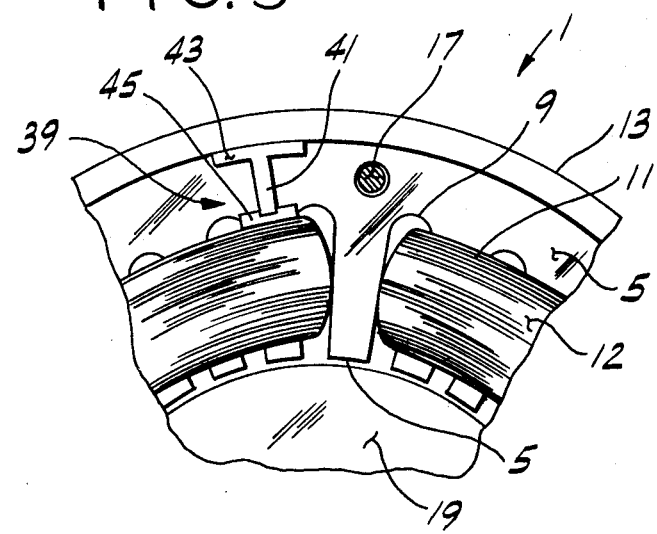

AIR DEFLECTOR FOR ELECTRIC MOTOR

BACKGROUND OF THE INVENTION

This invention relates to an air deflector for use in an electric motor, and more particularly to such an air deflector which ensures that air circulated by the cooling fan of a motor mounted internally within the motor on the rotor shaft of the motor moves air longitudinally through the motor for cooling the motor rather than merely circulating the air in circular direction at one end of the motor.

In the operation of an electric motor, a considerable amount of heat is generated within the motor due to losses in the stator, stator windings, bearing friction, and losses in the rotor. Typically, motors are provided with a built-in cooling fan to circulate cooling air over the stator windings, through the air gap between the outer periphery of the rotor and the bore of the stator core, and through hole in the rotor core, and/or stator core as well as spaces between the stator core and shell. If the motor is sufficiently cooled, it will operate more efficiently and will have a longer service life.

In many electric motors, the cooling fans are axial or radial vane fans mounted on the rotor shaft or die-cast-in-place on the ends of the rotor. In certain motor designs, however, it has been found that the cooling air circulated by the cooling fan within the motor was not sufficient to prevent the temperature of parts of the motor from exceeding permissible temperature limits. It was found that although the fan was capable of circulating a sufficient flow of air through the motor, the air circulated by the fan moved in a circular direction within the motor housing adjacent the tips of the rotating fan blades and around the end turns of the stator windings and thus did not flow in a sufficient amount longitudinally through the motor.

In the co-assigned U.S. Pat. No. 3,518,467, a totally enclosed, fan cooled electric motor is disclosed which has auxiliary vanes and shrouds for aiding the flow of cooling air through the motor, for providing increased heat transfer area, and for directing cooling air over the exterior surfaces of the motor. However, these auxiliary vanes and shrouds could not be adapted to many conventional motor designs because of insufficient space adjacent the ends of the stator windings and the end shield. Also, this prior auxiliary vane system required substantial modifications to be made to the motor.

SUMMARY OF THE INVENTION

Among the several objects and features of this invention may be noted the provision of an air deflector which may be readily installed in a variety of conventional electric motor designs without modification to the motor;

The provision of such an air deflector which effectively inhibits the circular circulation of air within the motor and which reliably directs air longitudinally through the motor so as to ensure adequate cooling for all parts of the motor;

The provision of such an air deflector which is easy and fast to install either during manufacture of the motor or in the field; and The provision of such an air deflector which is inexpensive to manufacture and which is reliable in operation.

Briefly, an air deflector system of this invention is intended for use in an electric motor having stator assembly including a stack of laminations constituting a stator core with a central bore therethrough and a plurality of radial slots formed therein. A plurality of winding coils is inserted in the slots of the stator core with the end turns of the windings extending out beyond the stator core. The motor further has a housing or shell within which the stator assembly is mounted, and a rotor is rotatable within the bore of the stator core. A shaft is affixed to the rotor and end shields at each end of the shell journal the shaft in bearings for rotation of the rotor within the stator. A fan having a plurality of generally radial vanes is rotatable with the shaft and the rotor. The air deflector system of this invention includes at least one air deflector adapted to be mounted within the motor between the shell of the motor and the end turns of the stator windings and between the adjacent end shield and a face of the stator core thereby to substantially block the circular flow of air within the motor and to aid the fan in circulating air in axial direction through the motor.

Other objects and features of this invention will be in part apparent and in part pointed out hereinafter.

BRIEF DESCRIPTION OF THE DRAWINGS

FIG. 1 is a longitudinal cross sectional view of a conventional electric motor illustrating a first embodiment of the air deflector of this invention installed in the motor;

FIG. 2 is a cross sectional view taken along line 2—2 of FIG. 1;

FIG. 3 is an enlarged view of a portion of the motor shown in FIG. 1 showing the deflector in cross section;

FIG. 4 is a side elevational view of the deflector shown in FIGS. 1-3;

FIG. 5 is a view similar to FIG. 3 illustrating a second embodiment of the air deflector of this invention installed in the motor;

Corresponding reference characters indicate corresponding parts throughout the several views of the drawings.

BRIEF DESCRIPTION OF PREFERRED EMBODIMENTS

Figure 6:
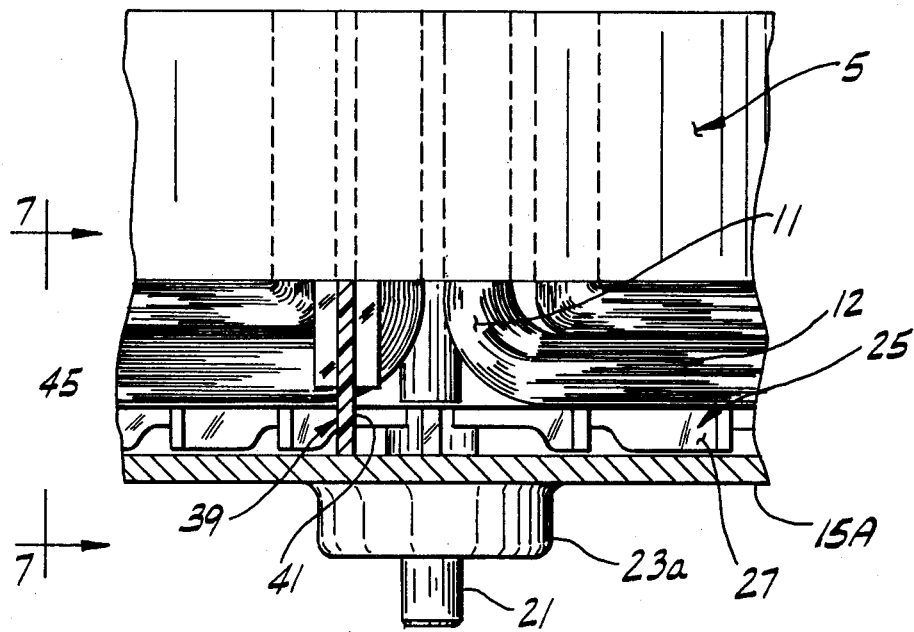
FIG. 6 is a plan view of a portion of the motor shown in FIG. 5 with the outer housing or shell of the motor removed.

Referring now to the drawings, a conventional electric motor, as indicated in its entirety at 1, is shown to comprise a stator assembly 3. The latter includes a stack or core 5 of soft iron lamination plates having a central bore 7 therethrough and having a plurality of radial slots 9 extending outwardly from the bore and longitudinally (i.e., axially) through the core. A plurality of stator winding coils 11 are inserted in these slots. The stator windings have end turns 12 which extend endwise from stator core 5. The motor further comprises a cylindric shell or housing 13 surrounding the stator assembly and extending endwise out beyond the stator core at both ends thereof. A pair of rigid end shields 15a, 15b is provided, one at each end of the shell. These end shields are secured to the stator assembly by means of through-bolts or stator screws 17 which extend axially through prepositioned openings in the stator core of the motor. A rotor, as generally indicated at 19, is affixed to a rotor shaft 21. The rotor shaft is journalled in anti-friction bearings 23a, 23b carried by respective end shields 15a, 15b for rotation of the rotor and the shaft about the longitudinal axis of the shaft. As shown, shaft 21 and bore 7 of the stator are substantially coaxial and rotor 19 is only of slightly smaller diameter than the internal diameter of bore 7 so that a narrow air gap exists between the periphery of rotor 19 and bore 7. As generally indicated at 25, a cooling fan is affixed to and is rotatable with shaft 21 and rotor 19. The fan includes a plurality of elongate radially extending vanes 27. While fan 25 is shown to be separate from rotor 19, it will be understood that the fan blades could be part of the rotor (i.e., integrally die-cast with the rotor) and extend from the rotor in both endwise and radial direction.

In FIGS. 1-4, a first embodiment of an air deflector of this invention is indicated generally at 29. This deflector is shown to comprise a one piece body of molded synthetic resin material or the like having a main body portion 31 with an opening 33 extending longitudinally therethrough for reception of a respective stator screw 17. In FIG. 1, deflectors 29 are shown to be of a length such as to extend from an adjacent face of stator core 5 to end shield 15a. The deflector includes a pair of spaced legs 35, 35' adapted to bear against the inside surface of shell 13, and a blade portion 37 adapted to extend radially inwardly so as to be adjacent to (and preferably to contact) the outer surface of stator winding and turns 12 and to be adjacent (but clear of) the tips of fan vanes 27 thereby to substantially block the circular flow of air within motor 1 at the ends of the motor and to ensure the flow of air in longitudinal or axial direction through the motor. This in turn ensures that all portions of the motor will be adequately cooled. As shown in FIG. 2, two deflectors 29 are installed on the motor. However, it will be understood that even one such deflector would disrupt the circular flow of air at the ends of the motor. Thus, virtually any number of deflectors may be installed in the motor in accordance with this invention.

To install a deflector 29 of this invention in motor 1, a stator through bolt 17 is inserted in opening 33 of the deflector with deflector legs 35a, 35b facing outwardly away from shaft 21. End shield 15a is then installed on shell 13 in the conventional manner and bolted thereto by the stator through-bolts. Upon securement of the end shields in place, the deflectors are held captive between stator core 5 in the end shield. The spaced legs 35a, 35b of the deflector bear against the inner face of shell 13 so as to hold the deflector in generally radial position with respect to fan 25 and prevent rotation of the deflector during operation of the motor.

Figure 7:
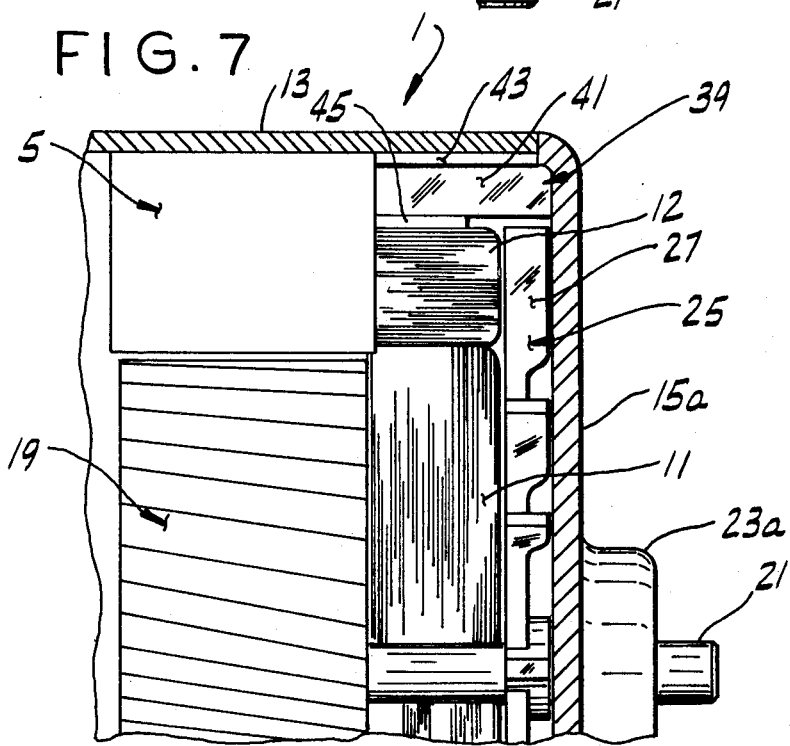
FIG. 7 is a side elevational view of the deflector shown in FIG. 6.

In FIGS. 5-7, a second embodiment of this air deflector of this invention is disclosed, the second embodiment being indicated in its entirety at 39. Deflector 39, like deflector 29 heretofore described, is preferably a one piece member of molded synthetic resin material. However, unlike deflector 29, deflector 39 is not secured in place within the motor by means of through-bolts 17, but rather is snapped or forced into position between stator shell 13 and the outer surfaces of the end turns 12 of windings 11 and is held captive between end shield 15a and stator core 5. More particularly, deflector 39 is shown in FIG. 5 to be a generally T-shaped member in cross section and to have a main body portion 41 adapted to be disposed generally radially within the motor and a laterally extending head 43 at the outer end of the main body portion adapted to bear against the inner face of shell 13. As indicated at 45, an inwardly depending leg is integrally cast or otherwise formed with main body 41. This leg normally extends inwardly from main body portion 41 and is adapted to engage the end turns 12 of windings 11 of the motor and to be deformed outwardly with respect to the motor (i.e., toward main body 41) upon installation of the deflector in the motor. Thus, the deformed leg exerts a resilient biasing force on deflector 39 so as to bias it outwardly and to resiliently hold it in engagement with both shell 13 and windings 11. As shown in FIG. 7, deflector 39 is of such a length as to extend between stator core 5 and the inner face of end shield 15a. Thus, the deflector is firmly held in place by the outward force of leg 45, shell 13, and by the end shield and core.

It will be appreciated that deflector 39 may be readily inserted into motor 1 merely by forcing the deflector into position between shell 13 and end turn windings 12 so as to deform leg 45. Upon installation of end shield 15a onto the motor in the conventional manner the deflector is held captive between the end shield and stator core 5. Thus, deflector 39, as well as deflector 29, may be readily installed on the motor without modification to the motor. With head 43 bearing against the inner face of shell 13, deflector 39 is prevented from rotating or twisting when installed within the motor. Also, deflector 39, like deflector 29, is positioned radially outwardly relative to the tips of fan vanes 27 and thus substantially blocks the circular flow of air within the motor 1 at the ends of the motor and ensures that the flow of air within the motor is in substantially longitudinal (or axial) direction through the motor.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. In an electric motor having a stator assembly including a stack of lamination plates constituting a stator core, the latter having a central bore therethrough and a plurality of radial slots therein, a plurality of windings inserted in said slots with the end turns of the windings extending in axial direction out beyond the ends of said stator core, said motor further having a shell within which said stator is mounted, a rotor rotatable within the bore of said stator core, a shaft affixed to said rotor, an end shield on at least one end of the shell, bearing means carried by the end shield for receiving said shaft and for journalling said rotor for rotation within the motor, a fan having a plurality of vanes rotatable with said shaft and rotor, said motor having one or more fasteners extending from said stator core in axial direction with respect to the motor toward said end shield, said fasteners being disposed radially outwardly from said stator windings and from the tips of said fan vanes, wherein the improvement comprises: at least one air deflector mounted within said motor adjacent the end turns of said stator windings between said stator windings and said shell and between said stator core and said end shield, and adjacent the tips of the fan vanes, said air deflector comprising an elongate unitary member having a longitudinal opening therethrough, said opening receiving a respective said fastener thereby to secure said deflector in position on said motor, said deflector substantially blocking the circular flow of air within said motor between said shell and said stator winding end turns and aiding said fan in circulating air in axial direction through the motor.

2. In an electric motor as set forth in claim 1 wherein said deflector has portions at the outer end thereof spaced from one another engagable with the inner surface of said shell so as to prevent rotation of the deflector with respect to the motor.

3. In an electric motor as set forth in claim 1 wherein said deflector further includes a blade portion extending radially inwardly with respect to said motor, said blade portion being disposed in close proximity to said stator windings.

4. In an electric motor having a stator assembly including a stack of lamination plates constituting a stator core, the latter having a central bore therethrough and a plurality of radial slots therein, a plurality of windings inserted in said slots with the end turns of the windings extending in axial direction out beyond said stator core, said motor further having a shell within which said stator is mounted, a rotor rotatable within the bore of said stator core, a shaft affixed to said rotor, an end shield at each end of the shell, bearing means carried by the end shields for receiving said shaft and for journalling said rotor for rotation within said stator core, a fan having a plurality of vanes rotatable with said shaft and rotor wherein the improvement comprises: at least one air deflector mounted within said motor between said windings and said shell and between said stator core and a respective said end shield, said air deflector being adjacent the tips of the fan vanes thereby to substantially block the circular flow of air in said motor and to aid the fan in circulating air in axial direction through the motor, said deflector having a flexible portion which is deformable upon installation of the deflector in the motor and which resiliently bears on said windings to position said deflector.

5. In an electric motor as set forth in claim 4 further having a main body portion disposed generally radially between the outer radial surfaces of said stator winding end turns and said shell and axially between a respective end face of said core and a respective end shield, and wherein said main body portion has a laterally extending head thereon, said head being engageable with the inner surface of said shell so as to prevent rotation of said deflector.

6. In an electric motor as set forth in claim 1 or 4 wherein said deflector is unitary member molded of synthetic resin material.

* * * * *